United States Patent
David et al.

(10) Patent No.: US 7,188,208 B2
(45) Date of Patent: Mar. 6, 2007

(54) SIDE-BY-SIDE INVERTED MEMORY ADDRESS AND COMMAND BUSES

(75) Inventors: Howard S. David, Portland, OR (US); Bill H. Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 10/935,835

(22) Filed: Sep. 7, 2004

(65) Prior Publication Data

US 2006/0053243 A1    Mar. 9, 2006

(51) Int. Cl.
    *G06F 13/14*    (2006.01)
(52) U.S. Cl. ...................................... 710/305
(58) Field of Classification Search ................ 710/305
    See application file for complete search history.

(56) References Cited

U.S. PATENT DOCUMENTS

| | | | | |
|---|---|---|---|---|
| 4,994,690 A * | 2/1991 | Sundstrom et al. | ........... | 326/30 |
| 5,483,110 A * | 1/1996 | Koide et al. | ................ | 307/147 |
| 5,493,657 A * | 2/1996 | Van Brunt et al. | .......... | 710/305 |
| 5,923,856 A * | 7/1999 | Hazama et al. | ............. | 710/300 |
| 6,151,648 A * | 11/2000 | Haq | ........................... | 710/107 |
| 6,173,382 B1 * | 1/2001 | Dell et al. | ................... | 711/170 |
| 6,480,030 B1 | 11/2002 | Taguchi | | |
| 6,480,409 B2 * | 11/2002 | Park et al. | .................... | 365/63 |
| 6,480,946 B1 * | 11/2002 | Tomishima et al. | ......... | 711/167 |
| 6,496,445 B2 * | 12/2002 | Lee | ............................. | 365/233 |
| 6,542,031 B2 * | 4/2003 | Kwong | ....................... | 330/253 |
| 6,816,932 B2 * | 11/2004 | Cho et al. | ................... | 710/100 |
| 6,978,352 B2 * | 12/2005 | Raynham | .................... | 711/154 |
| 2002/0161968 A1 * | 10/2002 | Yoo et al. | ................... | 711/105 |

FOREIGN PATENT DOCUMENTS

EP    1253521 A2    10/2002

* cited by examiner

*Primary Examiner*—Paul R. Myers
(74) *Attorney, Agent, or Firm*—Philip A. Pedigo

(57) ABSTRACT

Generating a pair of buses, each coupled to a common terminating device, each having a set of address signal lines that are coupled to a separate memory device, and driving one set of address signal lines with an address driven with true logic states while driving the other set of address signal lines with the same address, but driven to opposing logic states, to achieve a greater balance between the quantity of signals across both buses that are driven to a high state versus those that are driven to a low state.

20 Claims, 6 Drawing Sheets

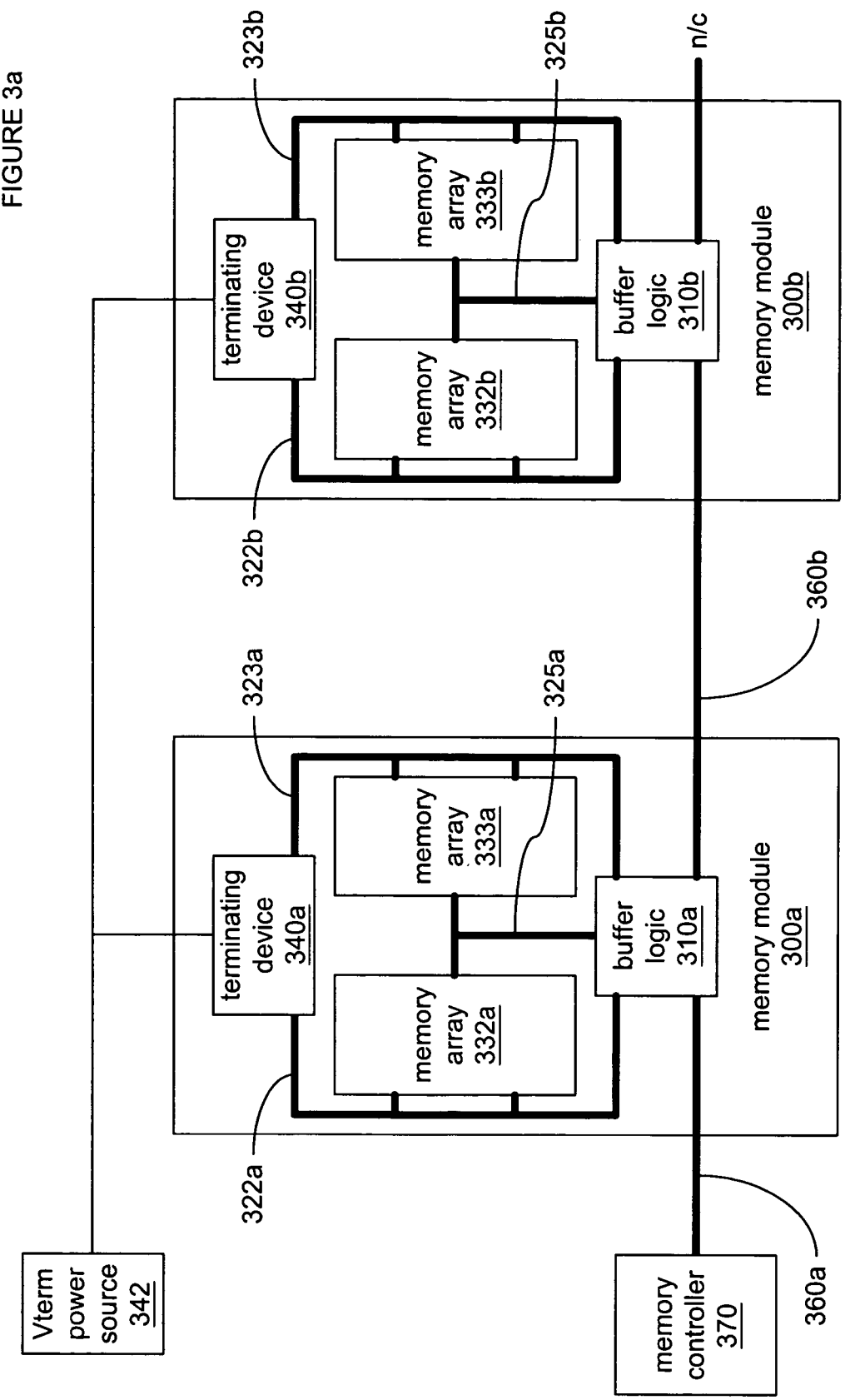

SIDE-BY-SIDE INVERTED MEMORY ADDRESS AND COMMAND BUSES

BACKGROUND

In the field of digital electronics, especially in the area of computer electronics, the rate at which commands and data are transferred between devices continues to be driven ever higher. This has lead to the inception of a great number of high speed buses based on a wide variety of differing designs, with some being rather specialized for particular purposes. However, as those skilled in the art will readily recognize, with higher transfer rates comes reduced time periods during which each transfer of addresses, commands and/or data may take place, and as a result, issues with the amount of time required for signals to settle before they can be reliably read, though small, does become increasingly significant.

Various forms of bus termination have become routinely employed as a way to counteract challenging conductor configurations, bus reflections from trace corners and end points, etc. However, the use of bus termination comes at the cost of greater power consumption and/or the provision of higher capacity power sources to provide a termination voltage. With multiple high speed buses being ever more commonly employed in a single electronic device, such as a computer system, the amount of power caused to be consumed by the use of termination can become very large. Also of concern are instances when such consumption of power can become very acute, such as when many or all of the signals of a high-speed bus are simultaneously driven to the same high or low state, and proper preparation for this possibility often requires the use of a termination voltage power source of greater capacity than is desired be allocated to accommodate this effect of using termination.

DESCRIPTION OF THE DRAWINGS

The objects, features, and advantages of the present invention will be to one skilled in the art in view of the following detailed description in which:

FIGS. 3a and 3b are block diagrams of embodiments employing a memory

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Embodiments of the present invention concern incorporating support for driving pairs of command and/or address buses such that a number of the conductors of one of the two buses is driven with signal levels that are inverted or opposite from at least the corresponding conductors of the other of the two buses. Although the following discussion centers on memory buses transmitting signals to and from memory devices making up memory systems, it will be understood by those skilled in the art that the invention as hereinafter claimed may be practiced in support of any type of bus in which termination is employed. Also, although at least part of the following discussion centers on buses within computer systems, it will be understood by those skilled in the art that the invention as hereinafter claimed may be practiced in connection with buses employing termination found within any type of electronic device.

Figure 1A:
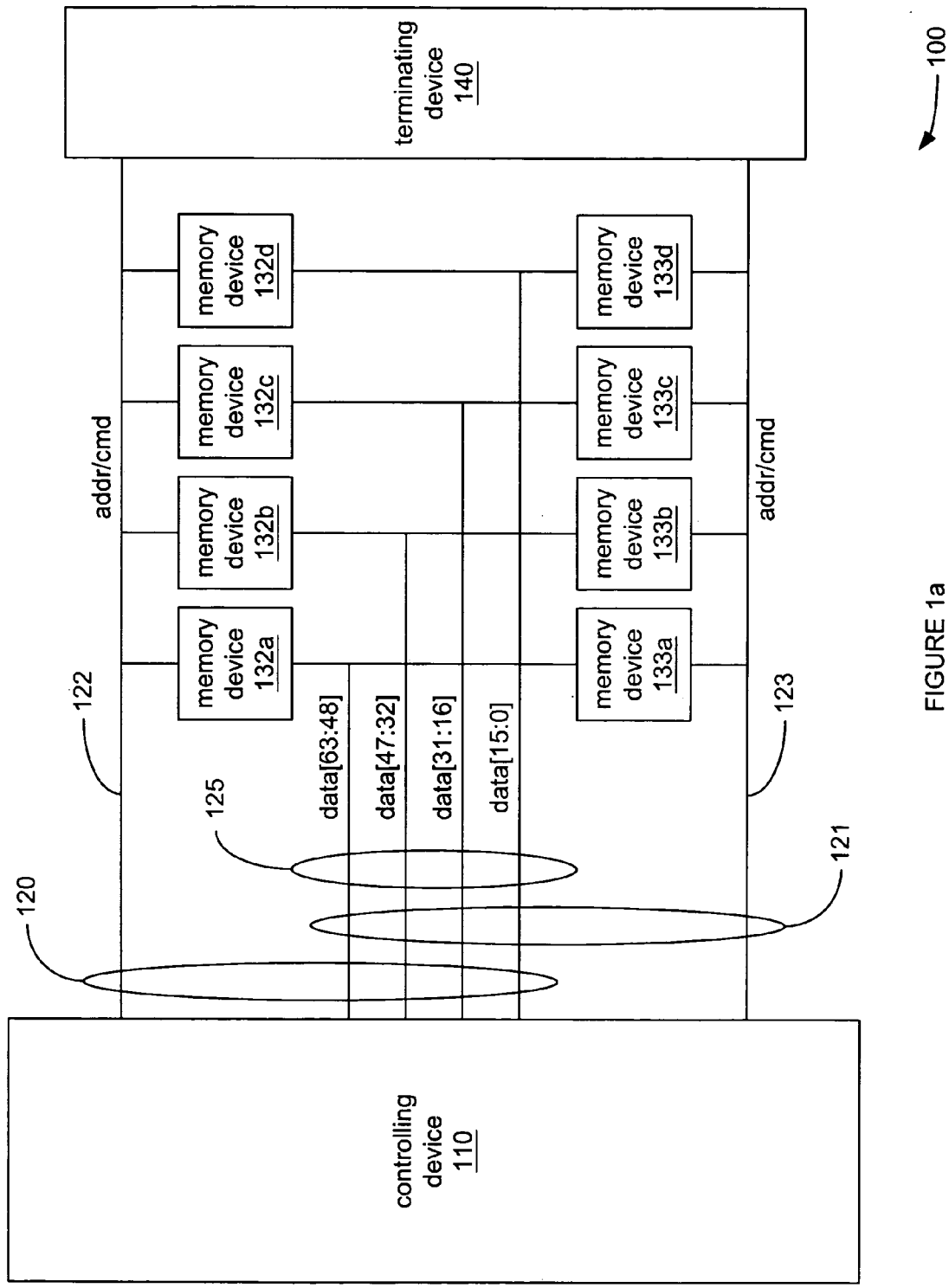
FIGS. 1a and 1b are blocks diagram of embodiments employing a memory
Figure 1B:
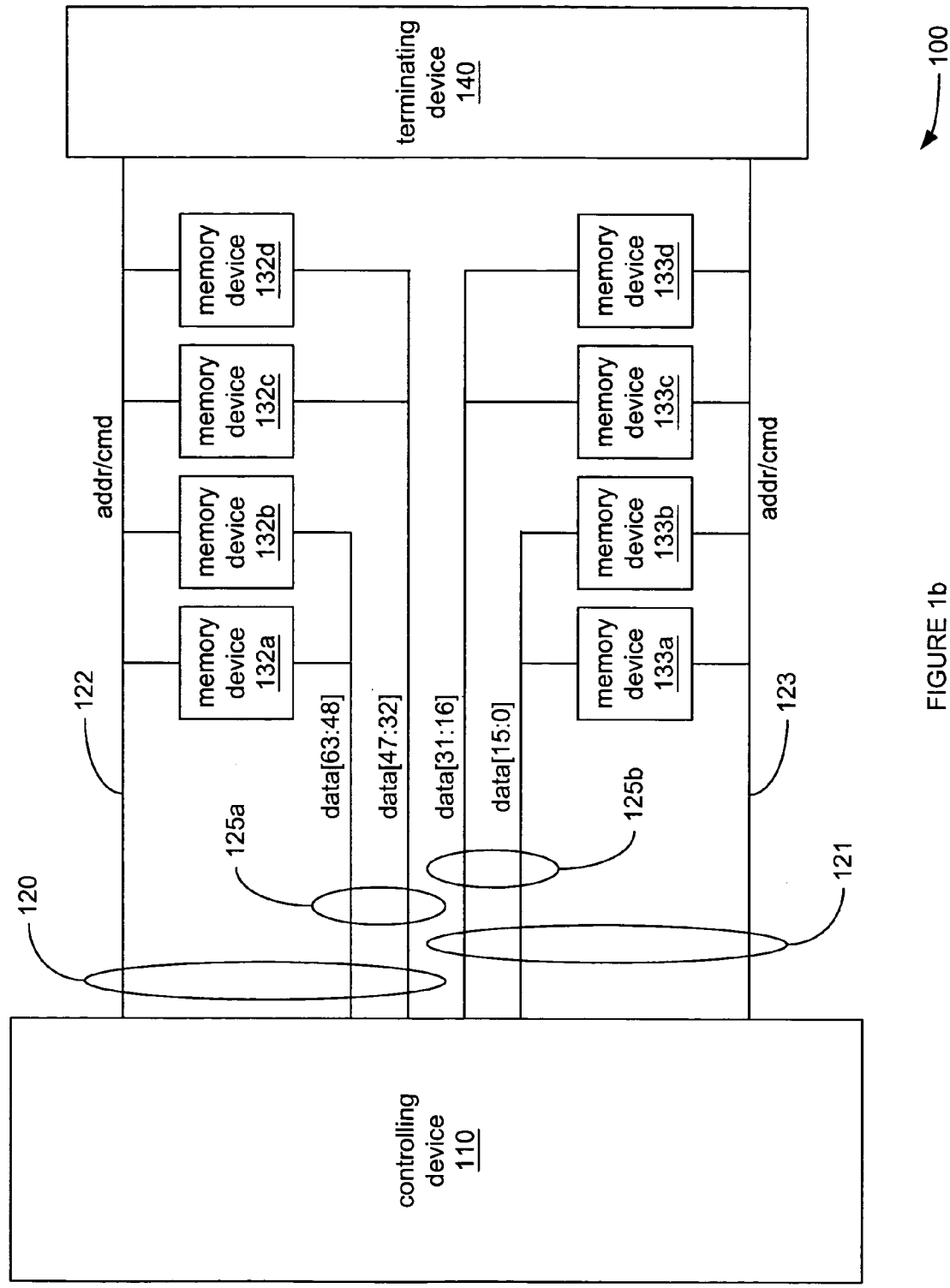

FIGS. 1a and 1b are simplified block diagrams of possible embodiments employing a memory system. In both FIGS. 1a and 1b, memory system 100 is, at least in part, made up of controlling device 110, memory devices 132a–d and 133a–d, and terminating device 140. In some embodiments, memory system 100 is a portion of a larger electronic device, such as a computer system, and controlling device 110 is among support logic used at least to link one or more processors to memory devices 132a–d and 133a–d to store and retrieve instructions and data for processing by one or more processors. In some embodiments, memory system 100 is implemented as a set of ICs soldered to a PCB making up a memory module, such as a SIMM, SIPP or DIMM, in which controlling device 110 provides buffering between memory devices 132a–d and 133a–d, and at least one external bus, coupled to controlling device 110, by which that memory module is interfaced to still other electronic components, possibly electronic components making up a computer system.

As depicted in FIG. 1a, controlling device 110 provides a pair of parallel memory buses, 120 and 121, with memory bus 120 being made up, at least in part, of address/command bus 122 and data bus 125, and memory bus 121 being made up, at least in part, of address/command bus 123 and data bus 125. In other words, memory buses 120 and 121 have separate sets signal lines by which addresses and/or commands are communicated, but share a set of signal lines by which at least data is communicated. In contrast, as depicted in FIG. 1b, memory bus 120 being made up, at least in part, of address/command bus 122 and data bus 125a, while memory bus 121 being made up, at least in part, of address/command bus 123 and data bus 125b. In other words, memory buses 120 and 121 have both separate sets signal lines by which addresses and/or commands are communicated, and separate sets of signal lines by which at least data is communicated. Despite this depiction in FIGS. 1a and 1b of two particular choices between which signals within each of memory buses 120 and 121 are kept separate from the other and which signals that are shared between the two buses, those skilled in the art will readily recognize that other variations of which signals are separate and which are shared may be resorted to without departing from the spirit and scope of the claimed invention. Indeed, those skilled in the art of the design of memory systems will readily recognize that FIGS. 1a and 1b each depict relatively simple memory systems, that together they depict but a tiny sampling of the possible configurations of memory systems that may be implemented, and that many alternate embodiments are possible in which the exact arrangement and configuration of components may be reduced, augmented or otherwise altered without departing from the spirit and scope of the present invention as hereinafter claimed.

Controlling device 110 initiates and controls memory operations carried out on memory devices 132a–d and 133a–d across memory buses 120 and 121 to both store and retrieve information, as well as other functions to maintain the integrity of stored information (e.g., memory refresh). In some embodiments, controlling device 110 may either be a processor or may have processing elements whereby the memory operations carried out by controlling device 110 to store and retrieve data and/or instructions are largely for its own use. In other embodiments, controlling device 110 may be a memory controller and/or a buffering device between another device coupled to controlling device 110 (not shown) and memory devices 132a–d and 133a–d, wherein controlling device 110 carries out memory operations in response to commands to store and/or retrieve information received by controlling device 110 from such other device.

Also as depicted in FIG. 1, both address/command buses 122 and 123 are of a so-called "multi-drop" configuration wherein one end of each of address/command buses 122 and 123 are coupled to controlling device 110, the other end of each of address/command buses 122 and 123 are coupled to terminating device 140, and memory devices 132a–d and 133a–d are coupled to address/command buses 122 and 123, respectively, at points along the lengths of address/command buses 122 and 123. In contrast, as is also depicted, at least the majority of the signal lines making up either data bus 125, or the pair of data buses 125a and 125b, are each coupled to lesser numbers of memory devices 132a–d and 133a–d. Although for sake of clarity the data signal lines making up data bus 125 or data buses 125a and 125b are not shown as coupled to any form of terminating device, it will be readily understood by those skilled in the art, that the data bus signals may well be so coupled to a terminating device. This configuration of couplings, in which the address and/or command signal lines of address/command buses 122 and 123 are coupled to many more memory devices than the data signal lines of either data bus 125 or data buses 125a and 125b may be expected in embodiments that make use of such forms of memory interfaces as synchronous DRAM (SDRAM) interfaces, whether clocked at so called "single data rate" (SDR) or "double data rate" (DDR), and so on. Also, in various possible embodiments, it may, in fact, be this depicted disparity between the number of memory devices to which the data signal lines of either data bus 125 or data buses 125a and 125b are coupled and the number of memory devices to which the address and/or command signal lines of address/command buses 120 and 121 are coupled that provides impetus to having parallel sets of address and/or command signals, thereby giving rise to the presence of both address/command buses 122 and 123.

Terminating device 140, as mentioned earlier, is coupled to one end of at least the majority of the signal lines making up address/command buses 122 and 123 to aid in avoiding signal reflections and/or other undesirable events that may otherwise force address/command buses 122 and 123 to be operated at a slower rate. However, as those skilled in the art will recognize, the use of terminating device 140 results in additional power consumption and/or the need to provide a termination power source with considerable current capacity, especially where widely unequal numbers of signals terminated by terminating device 140 are driven to high and low states, resulting in a substantial net flow of current into or out of terminating device 140 that would have to be sourced or absorbed by a termination power source supplying terminating device 140 with a terminating voltage midway between the high and low voltages to which the signal lines terminated by terminating device 140 are driven. In an effort to reduce the magnitude of this net current flow, and possibly reduce overall power consumption and/or allow a termination power source of lesser capacity to be used, at least a majority of the address signal lines of address/command bus 122 are operated in their true state while at least a majority of the address signal lines of address/command bus 123 are operated in an inverted state, i.e., operated with high and low states that are the opposite of their true states. For example, a binary address value of 0000h output by controlling device 110 would be transmitted as 0000h across the address signal lines of address/command bus 122, but would be simultaneously transmitted as FFFFh across the address signal lines of address/command bus 123, thereby causing equal numbers of signal lines coupled to terminating device 140 to be high and low so as to aid in reducing the net flow of current into or out of terminating device 140 towards zero. Of course, as those skilled in the art will readily recognize, it is likely unrealistic to expect that such a net flow of current will often actually be fully reduced to zero due to inherent imperfections in manufacturing processes introducing variations in relative driver strengths, conductor trace lengths, resistances and capacitances.

This operation of address/command buses 122 and 123 with corresponding ones of address and/or control signal lines operated as inverted pairs is possible due to address/command buses 122 and 123 being operated as copies or mirror images of each other, at least most of the time, such that one may actually be generated from the other using inverters within controlling device 110 with relative ease, and due to the fact that the actual order in which address locations are used within memory devices has no meaning to the memory devices, themselves. In other words, where storing and retrieving data is concerned, the operation of any one of memory devices 133a–d will not be adversely affected by the use of address values that are inverted from the address values used in the operation of any corresponding one of memory devices 122a–d. However, while storing or retrieving data within memory devices may not be affected through the use of inverted address values, access to registers that may exist within each of memory device 132a–d and 133a–d might be so affected, and so operations carried out by controlling device 110 to access such registers may be required to be carried out with both of these buses being operated with true (i.e., non-inverted) high and low states.

Figure 2:
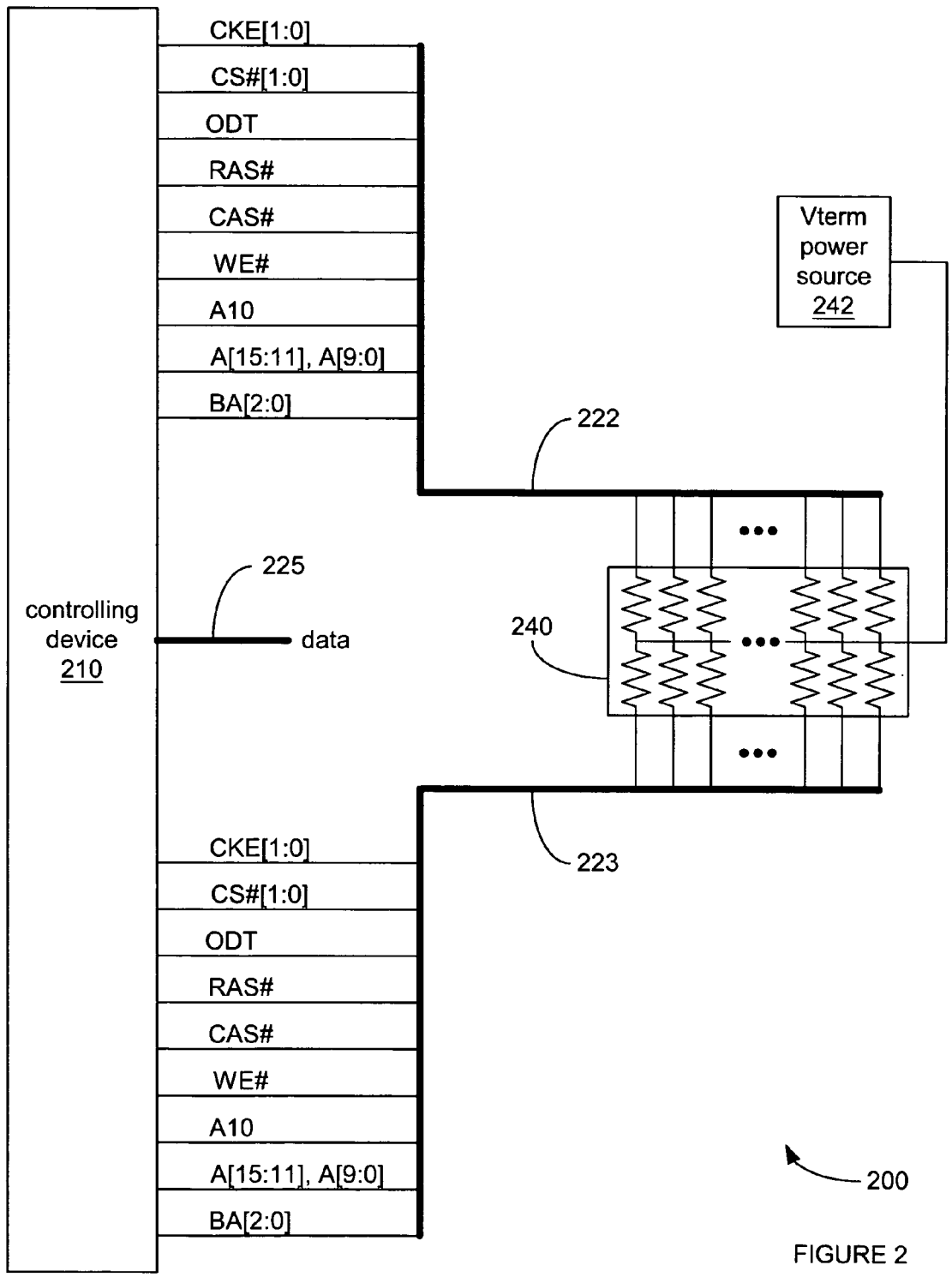
FIG. 2 is a block diagram of another embodiment employing a memory

FIG. 2 is a simplified block diagram of another embodiment employing a memory system. Memory system 200 is depicted in a somewhat similar configuration to memory system 100 of FIGS. 1a and 1b, but with certain portions omitted from view and other portions depicted with greater detail. Not unlike memory system 100, memory system 200 is, at least in part, made up of controlling device 210, terminating device 240, and a multitude of memory devices, however, for the sake of clarity of discussion, those memory devices are not depicted FIG. 2. Memory system 200 may, in various possible embodiments, be implemented as an integral portion of a larger electronic system (such as a computer system) or may be implemented as a memory module that may optionally be coupled to an electronic system of any of a variety of types. Also, in various embodiments, controlling device 210 may carry out memory operations on those memory devices (not depicted) in response to commands from another device coupled to controlling device 210 (not shown), or to aid in carrying out processing operations of its own, as might be the case if controlling device 210 were a processor.

As was the case with controlling device 110, either data bus 125 or data bus 125a and 125b, and address/command buses 122 and 123 of memory system 100, controlling device 210 provides a pair of parallel memory buses, with one memory bus being made up, at least in part, of address/command bus 222 and data bus 225, and the other being made up, at least in part, of address/command bus 223 and data bus 225. The coexistence of two address/command buses 222 and 223 may be based on the need to drive a large quantity of memory devices such that it is deemed that no one address/command bus is able to do so in a desirable manner, in which case, address/command buses 222 and 223 operate largely as twin buses on which similar memory operations are normally carried out, simultaneously, by controlling device 110. Also not unlike memory system 100, address/command buses 222 and 223 are made up of separate sets of corresponding signals that are operated most of the time such that they mirror or copy each other, but with high and low states that are inverted or opposite states from each other. In various possible embodiments, data bus 225 is made up of signals that may be largely shared, as was the case with data bus 125, or that may be largely separate, as was the case with data buses 125*a* and 125*b*. Though not fully depicted in FIG. 2, both address/command buses 222 and 223 are of a so-called "multi-drop" configuration wherein one end of each of address/command buses 222 and 223 are coupled to controlling device 210, and the other end of each of address/command buses 222 and 223 are coupled to terminating device 240, and a multitude of memory devices (not depicted) are coupled to address/command buses 222 and 223 at points along the lengths of address/command buses 222 and 223. In contrast, at least the majority of the signal lines making up data bus 225 are each coupled to lesser numbers of the memory devices (again, not shown) coupled to one or the other of address/command buses 222 and 223. Although the data signal lines making up data bus 225 are not shown as coupled to any form of terminating device for the sake of simplicity in depiction, it will be readily understood by those skilled in the art, that the data bus signals may well be so coupled to a terminating device, whether that terminating device is separate and distinct from the memory devices to which data bus 225 is coupled, or is incorporated within memory devices.

Unlike the depiction of memory system 100 in FIG. 1, specific signal lines making up each of address/command buses 222 and 223 are depicted in FIG. 2. Data bus 225 and both of address/command buses 222 and 223 may, in various possible embodiments, be configured to support the signaling specifications, timing and protocols of any of a number of possible memory interfaces, including FPM (fast page mode) memory devices, EDO (extended data out), dual-port VRAM (video random access memory), window RAM, SDR (single data rate), DDR (double data rate), RAMBUS™ DRAM, etc. However, in FIG. 2, a choice of signal lines is depicted that are appropriate to support an implementation of the "DDR2" standard controlled by the JEDEC Solid State Technology Association of Arlington, Va., and of which one recent revision is described in a document entitled "JEDEC Standard DDR2 SDRAM Specification, JESD79-2A," copyright 2004.

The specific signals from each of address/command buses 222 and 223 that are depicted are clock enable CKE0 through CKE1, chip select CS#0 through CS#1, on-die termination control ODT, row address strobe RAS#, column address strobe CAS#, write enable WE#, address signal lines A0 through A15, and bank select signal lines BA0 through BA2. However, as those skilled in the art will readily recognize, it is possible to have quantities of some of the signals making up address/command buses 222 and 223 other than those quantities that are depicted in FIG. 2 (e.g., having only CKE or having CKE0 through CKE2, instead of CKE0 through CKE1). To aid in conserving power, during at least the majority of memory operations carried out on address/command buses 222 and 223 by controlling device 210, at least corresponding ones of these specifically depicted signals between address/command buses 222 and 223 are driven with opposing high and low states in a manner not unlike what was briefly discussed with regard to memory system 100. For example, in a memory operation in which a an address is transferred during a bus cycle, address signal line A7 of address/command bus 222 is driven high, while corresponding address signal line A7 of address/command bus 223 is driven low, thus providing both a low and a high voltage level on separate signal lines that terminate at terminating device 240, with the result that an equal flow of current into and out of terminating device 240 is established between these two corresponding ones of address signal line A7. In embodiments where Vterm power source 242 supplies terminating device 240 with a terminating voltage midway between the high and low voltages to which the signal lines terminated by terminating device 240 are driven, having a balance between the number of such terminated signal lines that are driven high and those that are driven low tends to reduce the current flow taking place between terminating device 240 and Vterm power source 242 towards zero, which in turn, may conserve power and/or allow the use of an implementation of Vterm power source 242 with a reduced current capacity.

It should be noted, that although terminating device 240 is depicted in FIG. 2 as a resistor network, those skilled in the art will readily recognize that terminating device 240 may be of any one of many possible circuit designs, including circuit designs made up of more than one terminating component, and circuit designs providing either active or passive forms of termination. It should also be noted that although the discussion herein is of efforts to attempt to reduce the net current flow between terminating device 240 and Vterm power source 242 to a zero net current flow, those skilled in the art will readily recognize that such a theoretical goal is unlikely to occur very often in real world implementations, since ideal component values, such as the resistance values of the resistors depicted within terminating device 240, the drive strength of signal drivers employed by controlling device 210, the capacitance of PCB signal traces, etc., are rarely actually achieved as inherent imperfections in manufacturing processes often result in variations from ideal values. Therefore, it is likely that there will always be at least a very small flow of current between terminating device 240 and Vterm power source 242 arising at least from imperfections within terminating device 240, regardless of whether terminating device 240 is implemented as a resistor network, as depicted, or is implemented with some other circuit design. It should also be noted that striving to achieve a balance between the number of signal lines terminated by terminating device 240 being driven to a high state and those being driven to a low state, may require the total number of signal lines terminated by terminating device 240 to be of an even quantity, although other embodiments may use an odd quantity of signal lines with opposing states used to attempt to limit the imbalance between high and low driven signal lines to just one in either direction.

As a result of supporting an implementation of the DDR2 specification, address signal lines A0 through A9, address signal lines A1–A15, and bank select signal lines BA0 through BA2 are likely to be the only signals lines that can be routinely driven with corresponding pairs of opposing values between address/command buses 222 and 223 during the majority of memory operations, with at least one exception being read and write operations to access registers within memory devices, since the address lines are actually used to transfer data during such register accesses, and therefore, must be driven to true states to all memory devices during such accesses. The fact that only A0–A9, A11–A15 and BA0–BA2 are likely to be so amenable to the use of opposing high and low states between corresponding pairs of signal lines arises from the fact that the protocols of DDR2 require that most of the other signals invariably be driven with true (i.e., non-inverted values) on all occasions, including the CKE0, CKE1, CS#0, CS#1, ODT, RAS#, CAS# and WE# command signal lines. Therefore, in a number of commonly carried out memory operations, it will often not be possible to reduce the amount of current flowing between terminating device 240 and termination voltage (Vterm) power source 242 to a net flow of zero only through use of opposing states between corresponding ones of A0–A9, A11–A15 and BA0–BA2. However, an examination of the various states of the control lines during various memory operations reveals that the number of command lines having high versus low states largely balances during most bus cycles that occur in support of those memory operations, and this combined with the ability to at least drive A0–A9, A11–A15 and BA0–BA2 with inverted values does enable a considerable reduction in the amount of current that is likely to flow between Vterm power source 242 and terminating device 240 in most instances.

However, some memory operations, such as reading from or writing to registers within memory devices, may require most, if not all, of the signal lines of address/command buses 222 and 223 to be driven to true states that may result in widely differing numbers of signal lines driven high versus those driven low. In various possible embodiments, additional measures may be taken in an effort to increase the likelihood of achieving a net current flow of zero between terminating device 240 and Vterm power source 242. One such simple measure that may be taken in some embodiments during no-op bus cycles is to drive one or more of ODT, RAS#, CAS# and WE# to a low state on one or both of address/command buses 222 and 223 to balance the high state to which CS#0, CS#1, CKE0 and CKE1 on both address/command buses 222 and 223 are driven to signal a no-op bus cycle.

In some embodiments, corresponding ones of address signal line A10 between address/command buses 222 and 223 may also be driven with opposing values, however, unlike address signal lines A0–A9, A11–A15 and BA0–BA2 which are highly amenable in almost every bus cycle to the use of opposing values during most memory operations, address signal line A10, in addition to serving as an address signal line, is also used in DDR2 to specify whether or not a precharge command is directed to all banks of a memory device or just one bank. For this reason, the use of opposing signal values across the corresponding pair of A10 address signal lines can be carried out during the transmission of a more limited range of memory operations, including at least the row activate, no-op and refresh commands, but not during at least the precharge, precharge-all, and all read or write commands (whether involving memory locations or registers, and whether or not with auto-precharge). Other ones of signal lines A0–A15 and/or BA0–A02 may similarly be employed to serve multiple purposes, and thereby, become similarly more restrictive in terms of opportunities to be driven to opposing states.

In some embodiments, the fact that many commonly used memory devices do not actually make use of all 16 bits that may be transmitted by address signal lines A0–A15 during bus cycles in which addresses are transferred, resulting in some number of address lines remaining frequently unused, may be availed of to achieve a further balancing of the number of signal lines in high versus low states across both address/command buses 222 and 223. For example, in embodiments of memory system 200 in which memory devices are used that perhaps use only address signal lines A0–A11 in memory operations other than reads or writes to registers, address signal lines A12–A15 on both address/command buses 222 and 223 are left available for use in this manner, providing up to eight signal lines that may be used to achieve a balance of high and low states in the vast majority of memory operations. However, even with one or more of A12–A15 being available for such balancing, use of A12–A15 for such balancing would have to be suspended at least for read and write operations to registers within memory devices, since all of A0–A15 are used to transfer data in the bus cycles supporting such operations, and must always be driven in their true states on both address/command buses 222 and 223. However, during most other memory operations, at least some number of address signal lines serve no function and may be driven to high or low states, as needed, to balance the number of other address and command signal lines driven to high or low states, and a relatively simple accumulator circuit may be incorporated into controlling device 210 to determine how many of these address signal lines are to be driven to a high or low state in an effort to achieve such balancing.

Determining which of at least the address signal lines are not used during various bus cycles, and are therefore available to be driven high or low for purposes of balancing, would likely require some form of testing or identification procedure to be carried out by controlling device 210 and/or some other device capable of configuring controlling device 210 to determine what those available address signal lines are. In some embodiments, where at least some of the memory devices make up part of a memory module, such as a SIMM, DIMM, etc., there may be a non-volatile memory device (such as a serial EEPROM) that may be read by either controlling device 210 or another device to determine which address signal lines are available for balancing. In other embodiments, where memory system 200 makes up part of a computer system or other system having a processor with access to controlling device 210, the results of such testing and/or identification efforts as may be carried out may be used by such a processor to configure controlling device 210 to make use of such address signal lines as are found to be available for use in balancing and/or to make such use of such address signal lines during a chosen subset of possible bus cycles. It is often the case in memory devices coupled to DDR or other forms of memory interface that the quantity of address signal lines used to select a row will be different from the quantity of address signal lines used to select a column, and controlling device 210 may be configured, either autonomously or through a processor, to use different ones of the address signal lines for balancing during different cycles.

In some embodiments, the use of inverted signaling with some of the lower order address signal lines (e.g., A0, A1 and/or A2) may be prohibited when memory devices are programmed to employ a form of burst read or burst write access in which multiple read or write transfers are assembled together with a specific ordering of data being relied upon in such transfers that requires one or more of the lower order address signal lines to be driven to their true states on both address/command buses 222 and 223, and perhaps may not ever be driven with opposing states. Different forms of burst read or burst write access with differing predetermined orderings of data (e.g., nibble sequential burst order, burst interleaved order, etc.) may be specifically chosen to support and/or be optimal for specialized functions such as cache line fills for specific forms of processors. By way of example, use of burst interleaved order may be deemed optimal for use with "X86" series processors, such as those manufactured by Intel Corporation of Santa Clara, Calif.

During bus cycles in which registers within memory devices are being accessed, thereby forcing most, if not all, address and control signal lines within both address/command buses 222 and 223 to be driven in their true states, there is a greater likelihood of there being a greater disparity between the number of signal lines driven high and those driven low. To mitigate this during such bus cycles, in some embodiments, the combined capacitance of filtering capacitors in the vicinity of memory devices may be relied upon to bolster the current capability of Vterm power source 242, if the occurrences of such bus cycles are relatively infrequent, thereby allowing for the use of a form of Vterm power source 242 of relatively small current capacity. In other embodiments, bus cycles communicating addresses and commands needed for the accessing of registers within memory devices across both address/control buses 222 and 223 may be immediately preceded or followed by no-op bus cycles in which at least some of the address and command signals are driven to states opposite the states to which they were driven during the bus cycle needed for accessing such registers, with the result that a minimal net flow of current between Vterm power source 242 and terminating device 240 will occur across the span of two adjacent bus cycles. In still other embodiments, an operation to access registers in memory devices coupled to both address/command buses 222 and 223 may be split and staggered across two bus cycles such that the bus cycle occurring on address/command bus 222 to access registers in a memory device coupled to bus 222 is caused to occur at the same time that a no-op bus cycle with signal lines driven in opposing states occurs on address/command bus 223, followed later by a bus cycle on address/command bus 223 to access registers in a memory device coupled to bus 223 being caused to occur at the same time that a no-op bus cycle occurs on address/command bus 222. Such following or preceding of bus cycles to access memory device registers with no-op bus cycles, or such breaking apart and staggering of bus cycles to access memory device registers with a no-op bus cycle on the other address/command bus would require controlling device 210 to be provided with circuitry, and possibly programmed, to insert such no-op bus cycles with appropriate ones of the address and/or command lines being driven to the requisite high or low states.

In yet another embodiment, a bus cycle to access memory device registers may be preceded and/or followed by staged bus cycles that more slowly change between the use of opposing states across the address and/or command signal lines making up both address/command buses 222 and 223, and the use of the majority or all of the address and/or command signal lines in their true states. For example, a bus cycle in which memory device registers are accessed such that all of the address and command signals on address/command buses 222 and 223 are driven to their true states may be followed by a no-op bus cycle on both address/command buses 222 and 223 in which the address and command signals of one of address/command bus 222 and 223 are driven to their true states while the address and command signals of the other are driven with inverted states, and then followed by a no-op bus cycle on both address/command buses 222 and 223 where both are driven to inverted states. These two additional cycles following the original bus cycle to access memory device registers may then be followed by a further no-op cycle in which, once again, one of address/command buses 222 and 223 are driven with true states while those of the other are driven to inverted states as a precursor to returning to the regular use of one being operated with inverted states while the other is operated with true states. this would require controlling device 210 to be provided with circuitry, and possibly programmed, to insert two, or perhaps more, no-op bus cycles with appropriate ones of the address and/or command lines on the appropriate ones of buses 222 and 223 being selectively driven with inverted or non-inverted states in a predetermined sequence.

FIG. 3a is a block diagram of an embodiment employing a memory module. Memory controller 370 and memory module 300a are coupled together via point-to-point link 360a, and memory modules 300a and 300b are similarly coupled together via point-to-point link 360b. Memory modules 300a and 300b are of substantially the similar design, and both are shown chiefly to exemplify one possible embodiment of a memory system made up of a memory controller and memory modules connected together by point-to-point links, as just described. In this exemplified embodiment of a memory system, memory controller 370 transmits addresses and commands, as well as exchanging data, to both memory modules 300a and 300b through point-to-point link 360a. Buffer logic 310a within memory module 300a receives these addresses and commands, as well as engaging in this exchange of data, and responds to commands directed to memory module 300a by carrying out memory operations on memory arrays 332a and 333a within memory module 300a, while passing through addresses, commands and exchanges of data directed to memory module 300b between point-to-point links 360a and 360b, thereby allowing buffer logic 310b to respond as appropriate. In some embodiments, both terminating devices 340a and 340b of memory modules 300a and 300b, respectively, are further coupled to Vterm power source 342 to supply a termination voltage.

Memory module 300a is, at least in part, made up of buffer logic 310a, memory arrays 332a and 333a, and terminating device 340a. Buffer logic 310a, in a manner not unlike what has been described with regard to controlling devices 110 and 210 of FIGS. 1 and 2, is coupled to one end of each of address/command buses 322a and 323a, with the other end of each of address/command buses 322a and 323a coupled to terminating device 340a, with portions of memory arrays 332a and 333a coupled to address/command buses 322a and 323a, respectively, at various points along the lengths of each of these buses. Buffer logic 310a is further coupled to memory arrays 332a and 333a via data bus 325a in which data signal lines may or may not be shared between memory arrays 332a and 333a. A substantially similar make up of parts and couplings also exists within memory module 300b between buffer logic 310b, memory arrays 332b and 333b, terminating device 340b, address/command buses 322b and 323b, and data bus 325b. Given the similar designs of memory modules 300a and 300b, for sake of brevity, the following discussion will make reference only to components within memory module 300a, and not both memory modules.

In some embodiments, memory module 300a is implemented as a multitude of integrated circuits attached to a relatively small PCB provided with a card edge tab having contacts or other form of connector for connection with another PCB on which at least memory controller 370 resides and another connector into which memory module 300b may be inserted, thereby creating an electrical connection through which point-to-point links 360a and 360b, and possibly a connection to Vterm power source 342, are routed. In such embodiments, both memory arrays 332a and 333a may be made up of multiple memory ICs. Such other PCB on which at least memory controller 370 resides may be a circuitboard of a computer system with memory controller 370 being a portion of the logic used to interface a processor of some form to memory module 300a, among other devices such as peripherals, etc.

In a manner not unlike controlling devices 110 and 210 of FIGS. 1 and 2, buffer logic 310a carries out memory operations on memory arrays 332a and 333a, transmitting addresses and commands to memory arrays 332a and 333a through address/command buses 322a and 323a, respectively, with the bus cycles that occur on one of these buses largely mirroring those occurring on the other. To aid in conserving power and/or to allow a form of Vterm power source 342 of lower current capacity to be used, buffer logic 310a transmits at least a portion of at least some addresses that are transmitted with binary signals in their true states on address/command bus 322a as inverted binary signals (i.e., with opposing high and low states) on address/command bus 323a, in a manner very much like that described above with regard to controlling devices 110 and 210. As was the case in memory systems 100 and 200, described above, the use of opposing high and low states between address/command buses 322a and 323a aids in limiting the amount of current flowing between terminating device 340a and Vterm power source 342, thereby aiding in limiting power consumption. In embodiments where multiple memory modules such as memory module 300a are employed and where such opposing high and low signal states are employed in such memory modules, the opportunity may be provided to keep the overall capacity and/or physical size of Vterm power source 342 relatively small, which could provide cost savings as well as power savings.

Figure 3B:
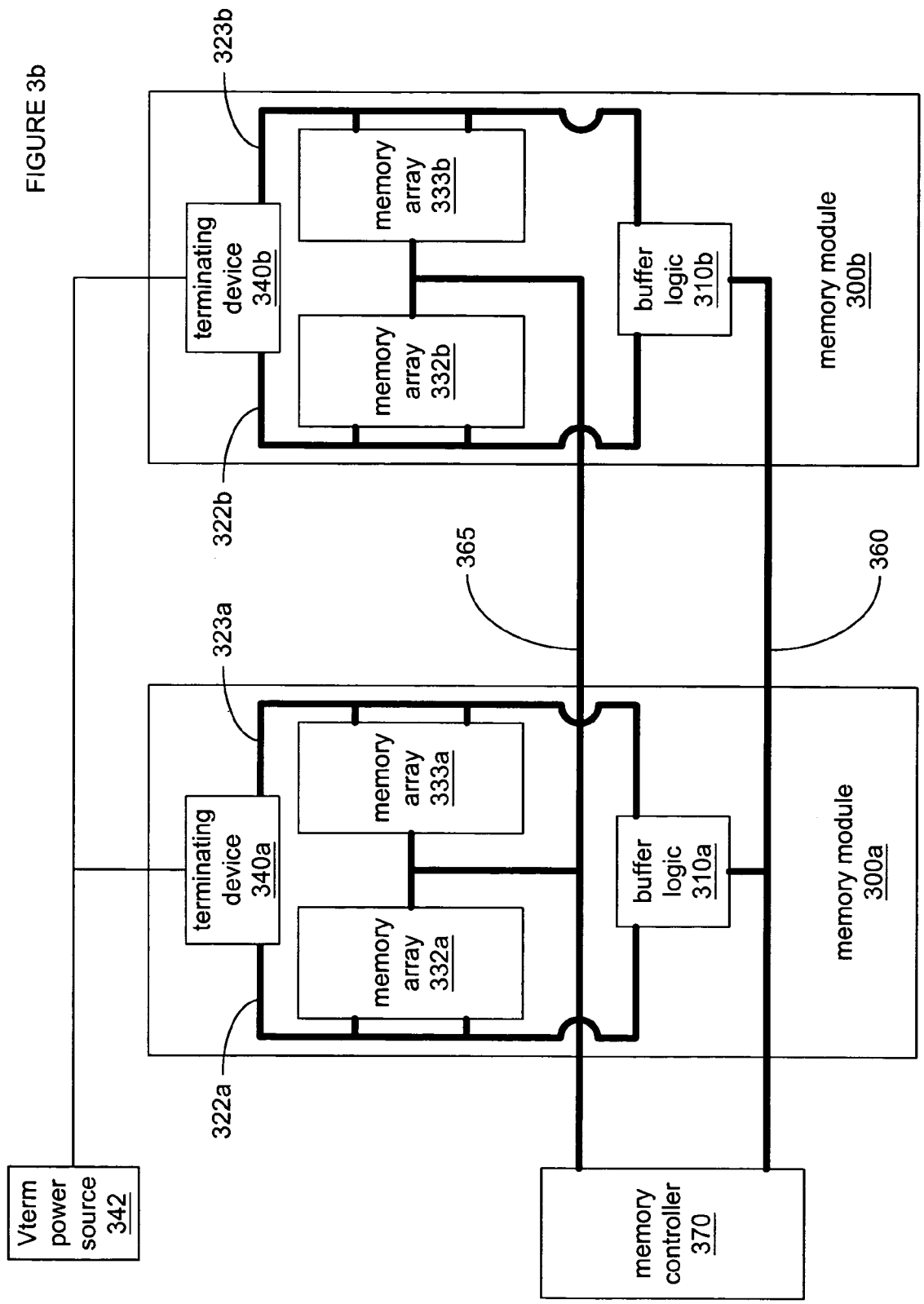

FIG. 3b is a block diagram of an alternate embodiment employing a memory module. Memory controller 370 is coupled to both memory modules 300a and 300b by address/command bus 360 and data bus 365. Memory modules 300a and 300b are of substantially the similar design, and both are shown chiefly to exemplify one possible embodiment of a memory system made up of a memory controller and memory modules connected together through a multi-drop bus topography as just described. In this exemplified embodiment of a memory system, memory controller 370 transmits addresses and commands to both memory modules 300a and 300b through address/command bus 360, with the address and command signal lines of address/command bus 360 being buffered and retransmitted as pairs of address/command buses (i.e., address/command buses 322a and 323a, and address/command buses 322b and 323b) that usually mirror each other in the bus cycles that occur, but with at least some of the address signal lines driven with opposing high and low states. Also, in this exemplified embodiment of a memory system, memory controller 370 exchanges data directly with memory arrays 332a, 333a, 332b and 333b across data bus 365. In some embodiments, both terminating devices 340a and 340b of memory modules 300a and 300b, respectively, are further coupled to Vterm power source 342 to supply a termination voltage.

Memory module 300a is, at least in part, made up of buffer logic 310a, memory arrays 332a and 333a, and terminating device 340a. Buffer logic 310a, in a manner not unlike what has been described with regard to controlling devices 110 and 210 of FIGS. 1 and 2, is coupled to one end of each of address/command buses 322a and 323a, with the other end of each of address/command buses 322a and 323a coupled to terminating device 340a, with portions of memory arrays 332a and 333a coupled to address/command buses 322a and 323a, respectively, at various points along the lengths of each of these buses. A substantially similar make up of parts and couplings also exists within memory module 300b between buffer logic 310b, memory arrays 332b and 333b, terminating device 340b, address/command buses 322b and 323b, and data bus 325b. Given the similar designs of memory modules 300a and 300b, for sake of brevity, the following discussion will make reference only to components within memory module 300a, and not both memory modules.

In some embodiments, memory module 300a is implemented as a multitude of integrated circuits attached to a relatively small PCB provided with a card edge tab having contacts or other form of connector for connection with another PCB on which at least memory controller 370 resides and another connector into which memory module 300b may be inserted, thereby creating an electrical connection through which address/command bus 360, data bus 365, and possibly a connection to Vterm power source 342, are routed. In such embodiments, both memory arrays 332a and 333a may be made up of multiple memory ICs. Such other PCB on which at least memory controller 370 resides may be a circuitboard of a computer system with memory controller 370 being a portion of the logic used to interface a processor of some form to memory module 300a, among other devices such as peripherals, etc.

As was briefly mentioned, above, buffer logic 310a retransmits bus cycles generated by memory controller 370 on address/command bus 360 to memory arrays 332a and 333a through address/command buses 322a and 323a, respectively, with the bus cycles that occur on one of these buses largely mirroring those occurring on the other. To aid in conserving power and/or to allow a form of Vterm power source 342 of lower current capacity to be used, buffer logic 310a transmits at least a portion of at least some addresses that are transmitted with binary signals in their true states on address/command bus 322a as inverted binary signals (i.e., with opposing high and low states) on address/command bus 323a, in a manner very much like that described above with regard to controlling devices 110 and 210. As was the case in memory systems 100 and 200, described above, the use of opposing high and low states between address/command buses 322a and 323a aids in limiting the amount of current flowing between terminating device 340a and Vterm power source 342, thereby aiding in limiting power consumption. In embodiments where multiple memory modules such as memory module 300a are employed and where such opposing high and low signal states are employed in such memory modules, the opportunity may be provided to keep the overall capacity and/or physical size of Vterm power source 342 relatively small, which could provide cost savings as well as power savings.

Figure 4:
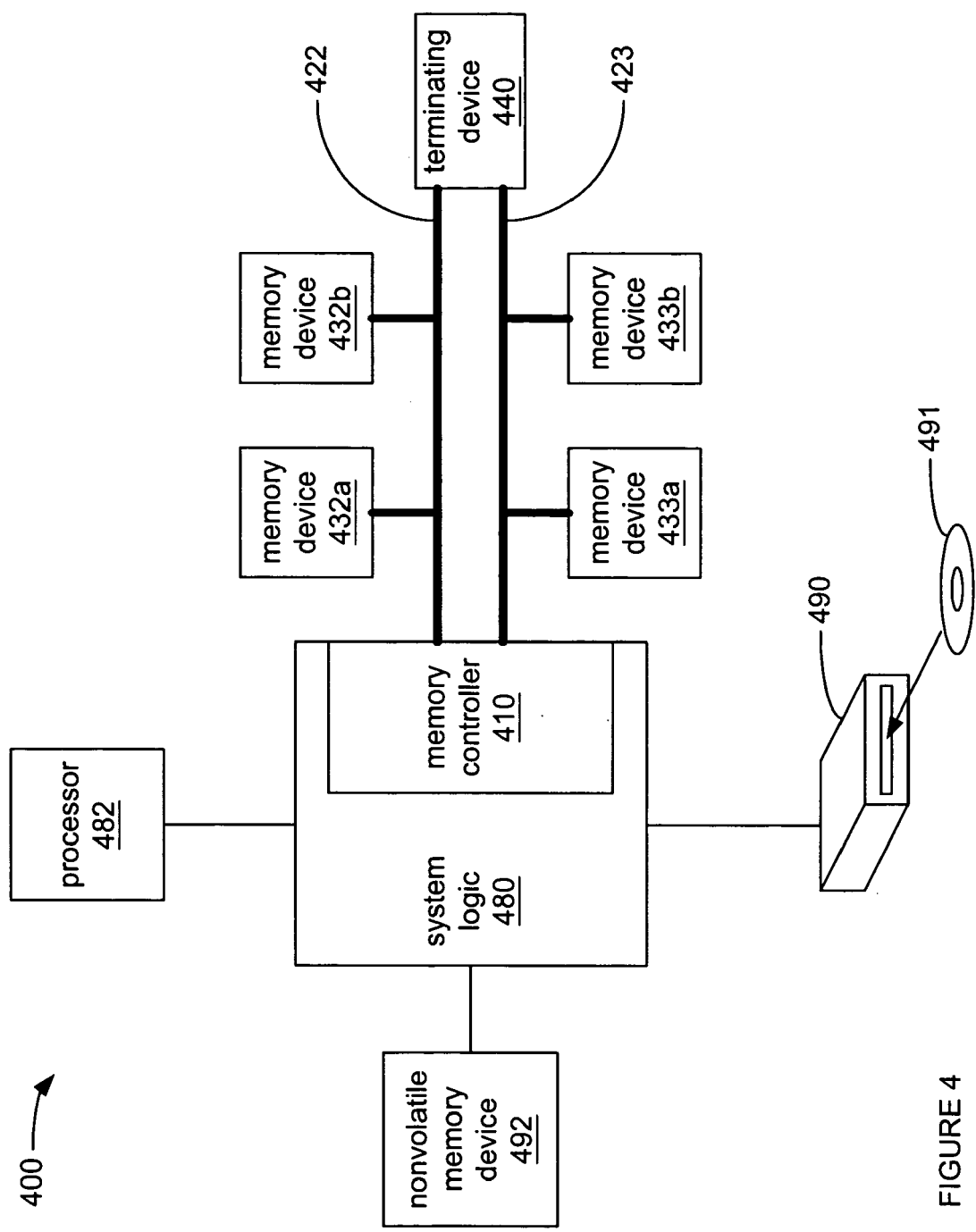
FIG. 4 is a block diagram of an embodiment employing a computer system.

FIG. 4 is a block diagram of an embodiment employing a computer system. Computer system 400 is, at least in part, made up of processor 482, system logic 480, and a memory system made up of at least memory controller 410 and one or more memory devices, such as 432a, 432b, 433a and 433b, which together, make up a form of core of processing and storage components capable of storing, retrieving and executing instructions.

The particular implementation of memory system that is depicted in FIG. 4 is made up of memory controller 410 (within system logic 480) coupled via memory bus 422 to memory devices 432a and 432b, and coupled via memory bus 423 to memory devices 433a and 433b. Furthermore, both memory buses 422 and 423 are further coupled to terminating device 440 in a topography arranged such that terminating device 440 provides termination of ends of at least some of the signal lines making up memory buses 422 and 423 opposite ends that are coupled to memory controller 410, while memory device 432*a*, 432*b*, 433*a* and 433*b* are coupled to their respective ones of memory buses 422 and 423 at points along the signal lines making up memory buses 422 and 423. As depicted, both memory buses 422 and 423 incorporate data signal lines, along with address and/or command signal lines such that there are few, if any, shared signal lines. Whether or not there are shared signal lines between memory buses 422 and 423, and how many of those signal lines are shared, may be dependent on such factors as a desire to reduce the pin count of one or more devices and/or connectors, the relative physical placement of components on a circuitboard, a desire to increase the speed of data transfers through the use of parallel sets of data signal lines, and/or any of a number of other factors that may influence the design of various possible embodiments, as those skilled in the art will readily recognize.

In some embodiments, memory controller 410 is but a portion of the circuitry making up a larger IC, such as system logic 480 that is coupled to processor 482 to provide various processor support functions, as depicted. In other embodiments, memory controller 410 is incorporated within a processing device, such as a processor with one or more than one processing cores. In still other embodiments, memory controller 410 is an entirely separate IC carrying out memory operations in response to commands received from another device coupled to memory controller 410.

In various possible embodiments, memory devices 432*a*, 432*b*, 433*a* and 433*b* are made up of one or more memory ICs directly coupled to one or the other of memory buses 422 and 423. In other possible embodiments, memory device 432*a*, 432*b*, 433*a* and 433*b* are made up of one or more memory modules of a configuration having multiple ICs attached to a miniature PCB that is coupled to one or the other of memory buses 422 or 423 via a connector attached to a circuitboard to which memory controller 410 is attached.

In some possible embodiments, terminating device 440 provides termination to data signal lines within memory buses 422 and 423, along with address and command signal lines. In various possible embodiments, terminating device 440 may be made up of many possible forms of electronic circuitry, including resistors, active termination circuits, etc., as those skilled in the art will readily understand.

In a manner not unlike controlling devices 110 and 210 of FIGS. 1 and 2, and buffer logics 310*a* and 310*b* of FIG. 3, memory controller 410 carries out memory operations on memory devices 432*a*, 432*b*, 433*a* and 433*b*, transmitting addresses and commands through address and command signal lines within memory buses 422 and 423, with the bus cycles that occur on one of memory buses 422 largely mirroring those occurring on memory bus 423. To aid in conserving power and/or to permit the use of a termination power supply with terminating device 440 that is of reduced current capacity (and therefore, may be less complex and/or costly) memory controller 410 transmits at least a portion of at least some addresses with binary signals in their true states on memory bus 422, and as inverted binary signals (i.e., with opposing high and low states) on memory bus 423. As was the case in earlier-described embodiments, the use of opposing high and low states between memory buses 422 and 423 aids in limiting the amount of power consumed through terminating device 440.

In some embodiments, processor 482 may have access to either nonvolatile memory device 492 (such as an EEPROM, ROM, FLASH, etc.) or media 491 (such as a floppy diskette, CD-ROM, tape, etc.) employed by storage device 490, either through system logic 480 or through some other coupling, by which processor 482 may retrieve a set of instructions. In such embodiments, such a set of instructions, when executed by processor 482, may cause processor 482 to carry out one or more tests, or take one or more other approaches, to identify various characteristics of memory devices 432*a*, 432*b*, 433*a* and/or 433*b* to determine exactly what signal lines are employed by one or more of these memory devices, and for what functions. After carrying out such tests or other approaches, processor 482 may be further caused to program memory controller 410 to selectively make use of, or selectively avoid making use of, opposing high and low states on one or more address and/or command signal lines of memory buses 422 and 423.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of memory devices employing any of a number of possible memory technologies. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. An apparatus comprising:
   a controlling device;
   a first bus, for coupling to a first device, coupled to the controlling device having a first set of address signal lines onto which an address is driven by the controlling device with the first set of address signal lines each driven to a true logic state;
   a second bus, for coupling to a second device, coupled to the controlling device having a second set of address signal lines onto which the address is driven by the controlling device with the second set of address signal lines each driven to an opposing logic state;
   a terminating device coupled to both the first and second sets of address signal lines; and
   a termination voltage power supply source coupled to the terminating device.

2. The apparatus of claim 1, wherein the first bus further comprises a first set of command signal lines of which at least one command signal line is driven to a true logic state, and wherein the second bus further comprises a second set of command signal lines of which at least one command signal line corresponds in function to the at least one command signal line of the first set of command signal lines and is driven to an opposing logic state.

3. The apparatus of claim 1, further comprising:
   a first memory device coupled to the first bus; and
   a second memory device coupled to the second bus.

4. The apparatus of claim 3, wherein the controlling device is a memory controller and further comprising a processor coupled to the controlling device to transmit commands to the controlling device to access data stored within the first and second memory devices.

5. The apparatus of claim 3, further comprising a first circuitboard to which the controlling device, the first and second memory devices and the terminating device are all attached, wherein the circuitboard is configured to mate with a memory module connector attached to a second circuitboard, forming an electrical connection therebetween through which the controlling device is coupled to a memory controller attached to the second circuitboard.

6. The apparatus of claim 3, wherein the controlling device ceases driving the address signal lines of the second set of address signal lines with logic states that oppose the logic states of corresponding ones of the address signal lines of the first set of address signal lines, and drives data onto both the first and second sets of address signal lines in a true state during a bus cycle to transfer data to registers within both the first and second memory devices.

7. An apparatus comprising:
a controlling device;
a first bus coupled to the controlling device having a first set of address signal lines onto which an address is driven by the controlling device with the first set of address signal lines each driven to a true logic state;
a second bus coupled to the controlling device having a second set of address signal lines onto which the address is driven by the controlling device with the second set of address signal lines each driven to an opposing logic state;
a terminating device coupled to both the first and second sets of address signal lines: and
a termination voltage power supply source coupled to the terminating device:
wherein the first bus further comprises a first set of command signal lines of which at least one command signal line is driven to a true logic state, wherein the second bus further comprises a second set of command signal lines of which at least one command signal line corresponds in function to the at least one command signal line of the first set of command signal lines and is also driven to a true logic state, and wherein the controlling device further comprises circuitry that tracks the quantity of command signal lines within the first and second set of command signal lines that are driven to a high state versus the quantity that are driven to a low state and causes the controlling device to drive at least one unused address signal line to a state selected to achieve a balance between the total quantity of address signal lines of both the first and second set of address signal lines and command signal lines of both the first and second set of command signal lines that are driven to a high state versus those that are driven to a low state.

8. A computer system comprising:
a controlling device;
a first bus coupled to the controlling device having a first set of address signal lines onto which an address is driven by the controlling device with the first set of address signal lines each driven to a true logic state;
a first memory device coupled to the first bus;
a second bus coupled to the controlling device having a second set of address signal lines onto which the address is driven by the controlling device with the second set of address signal lines each driven to an opposing logic state;
a second memory device coupled to the second bus;
a third bus coupled to the controlling device having a third set of address signal lines through which the address is transmitted to the controlling device;
a memory controller coupled to the third bus; and
a processor coupled to the memory controller.

9. The computer system of claim 8, further comprising:
a first circuitboard to which the processor, memory controller and a memory module connector are attached; and
a second circuitboard to which the controlling device, and both the first and second memory devices are attached, wherein the second circuitboard is configured to mate the memory module connector of the first circuitboard, forming an electrical connection therebetween through which the third bus is routed.

10. The computer system of claim 8, wherein the controlling device ceases driving the address signal lines of the second set of address signal lines with logic states that oppose the logic states of corresponding ones of the address signal lines of the first set of address signal lines, and drives data onto both the first and second sets of address signal lines in a true state during a bus cycle to transfer data to registers within both the first and second memory devices.

11. The computer system of claim 8, further comprising:
a terminating device coupled to both the first and second sets of address signal lines; and
a termination voltage power supply source coupled to the terminating device.

12. A computer system comprising:
a controlling device;
a first bus coupled to the controlling device having a first set of address signal lines onto which an address is driven by the controlling device with the first set of address signal lines each driven to a true logic state;
a first memory device coupled to the first bus:
a second bus coupled to the controlling device having a second set of address signal lines onto which the address is driven by the controlling device with the second set of address signal lines each driven to an opposing logic state;
a second memory device coupled to the second bus:
a third bus coupled to the controlling device having a third set of address signal lines through which the address is transmitted to the controlling device:
a memory controller coupled to the third bus: and
a processor coupled to the memory controller:
wherein the first bus further comprises a first set of command signal lines of which at least one command signal line is driven to a true logic state, wherein the second bus further comprises a second set of command signal lines of which at least one command signal line corresponds in function to the at least one command signal line of the first set of command signal lines and is also driven to a true logic state, and wherein the controlling device further comprises circuitry that tracks the quantity of command signal lines within the first and second set of command signal lines that are driven to a high state versus the quantity that are driven to a low state and causes the controlling device to drive at least one unused address signal line to a state selected to achieve a balance between the total quantity of address signal lines of both the first and second set of address signal lines and command signal lines of both the first and second set of command signal lines that are driven to a high state versus those that are driven to a low state.

13. A method comprising:
driving an address onto a first set of address signal lines of a first bus that is coupled to a first memory device and a terminating device such that the address signal lines of the first set of address signal lines are each driven to their true states; and driving the same address onto a second set of address signal lines of a second bus that is coupled to a second memory device and the terminating device such that the address signal lines of the second set of address signal lines are each drive to their opposing states.

14. The method of claim 13, further comprising:

ceasing to drive the address signal lines of the second set of address signal lines with logic states that oppose the logic states of corresponding ones of the address signal lines of the first set of address signal lines; and driving the address signal lines of both the first and second sets of address signal lines with data during a bus cycle to transfer data to registers within the first and second memory devices.

15. A method comprising:

driving an address onto a first set of address signal lines of a first bus that is coupled to a first memory device and a terminating device such that the address signal lines of the first set of address signal lines are each driven to their true states;

driving the same address onto a second set of address signal lines of a second bus that is coupled to a second memory device and the terminating device such that the address signal lines of the second set of address signal lines are each drive to their opposing states;

tracking the quantity of command signal lines within a first set of command signal lines of the first bus and a second set of command signal lines of the second bus that are driven to a high state versus the quantity of those that are driven to a low state; and driving at least one address signal line of the first and second sets of address signal lines that is not being driven with a portion of the address to a state selected to achieve greater balance between the total quantity of signal lines from the first and second sets of address signal lines and the first and second sets of command signal lines that are driven to a high state versus those that are driven to a low state.

16. The method of claim 15 further comprising:

carrying out at least one test of the first memory and second memory devices to determine which address signal lines of the first and second sets of address signal lines are not used during at least one bus cycle in which at least a portion of the address is transmitted; and programming a controlling device to drive at least one of the address signal lines determined not to be used during the at least one bus cycle to a state that serves to achieve a greater balance between the total quantity of signal lines from the first and second sets of address signal lines and the first and second sets of command signal lines that are driven to a high state versus those that are driven to a low state.

17. The method of claim 16, wherein carrying out at least one test of the first and second memory devices comprises reading a non-volatile storage device attached to a circuitboard to which the first and second memory devices are also attached to retrieve information from that non-volatile storage device concerning characteristics of the first and second memory devices.

18. A machine-accessible medium comprising code that when executed by a processor, causes the processor to:

carry at least one test of a memory device coupled to a memory controller to determine which address signal lines of a bus coupled to the memory device are not used during at least one bus cycle in which at least a portion of an address is transmitted; and programming the memory controller to drive at least one of the address signal lines determined not to be used during the at least one bus cycle to a state that serves to achieve a greater balance between a quantity of address signal lines and command signal lines that are driven to a high state versus those that are driven to a low state.

19. The machine-accessible medium of claim 18, wherein the processor carrying out at least one test, of the first and second memory devices comprises the processor reading a non-volatile storage device attached to a circuitboard to which the first and second memory devices are also attached to retrieve information from that non-volatile storage device concerning characteristics of the first and second memory devices.

20. The machine-accessible medium of claim 18, wherein the processor is further caused to configure the memory controller to track the quantity of command signal lines within a first set of command signal lines of the first bus and a second set of command signal lines of the second bus that are driven to a high state versus the quantity of those that are driven to a low state, and to drive at least one address signal line of the first and second sets of address signal lines that is not being driven with a portion of the address to a state selected to achieve greater balance between the total quantity of signal lines from the first and second sets of address signal lines and the first and second sets of command signal lines that are driven to a high state versus those that are driven to a low state.

* * * * *

UNITED STATES PATENT AND TRADEMARK OFFICE
CERTIFICATE OF CORRECTION

PATENT NO. : 7,188,208 B2  Page 1 of 1
APPLICATION NO. : 10/935835
DATED : March 6, 2007
INVENTOR(S) : Howard S. David and Bill H. Nale It is certified that error appears in the above-identified patent and that said Letters Patent is hereby corrected as shown below:

Col. 17, line 5, please replace "drive" with --driven--

Signed and Sealed this

Twenty-first Day of August, 2007

JON W. DUDAS
*Director of the United States Patent and Trademark Office*